United States Patent [19]
Hsu et al.

[11] Patent Number: 5,217,272
[45] Date of Patent: Jun. 8, 1993

[54] ROW SPACING TOOL

[76] Inventors: Stephen D. Hsu; Michael D. Hsu, both of 1767 Ross Ave., El Centro, Calif. 92243

[21] Appl. No.: 693,153

[22] Filed: Apr. 29, 1991

[51] Int. Cl.$^5$ ............................................. A47F 13/00
[52] U.S. Cl. .................................... 294/1.1; 294/19.1
[58] Field of Search ................... 294/1.1, 19.1, 32, 7, 294/22, 55, 49

[56] References Cited

U.S. PATENT DOCUMENTS

| | | | |
|---|---|---|---|
| D. 275,540 | 9/1984 | Barkow | 294/1.1 X |
| 338,499 | 3/1886 | Teller | 294/7 |
| 1,621,355 | 3/1927 | De Camp | 294/32 |
| 2,219,413 | 10/1940 | Dellar | 294/1.1 X |
| 2,593,674 | 4/1952 | Harnsberger | 294/7 X |
| 2,641,496 | 6/1953 | Benezet et al. | 294/1.1 |

*Primary Examiner*—Russell D. Stormer
*Assistant Examiner*—Joseph D. Pape
*Attorney, Agent, or Firm*—Leon Gilden

[57] ABSTRACT

A tool is provided for projecting the tool between rows of various components such as canned goods, and the like mounted upon shelving to properly space such rows for use and display and thereby minimize time and row positioning. The tool includes a fixed blade mounted to a handle, with the blade including an arcuate upper and lower surface of a forward planar end. The tool optionally may include adapter blades to provide varying thickness of the adapter blade enhanced blade structure to vary the aforenoted row spacings.

3 Claims, 4 Drawing Sheets

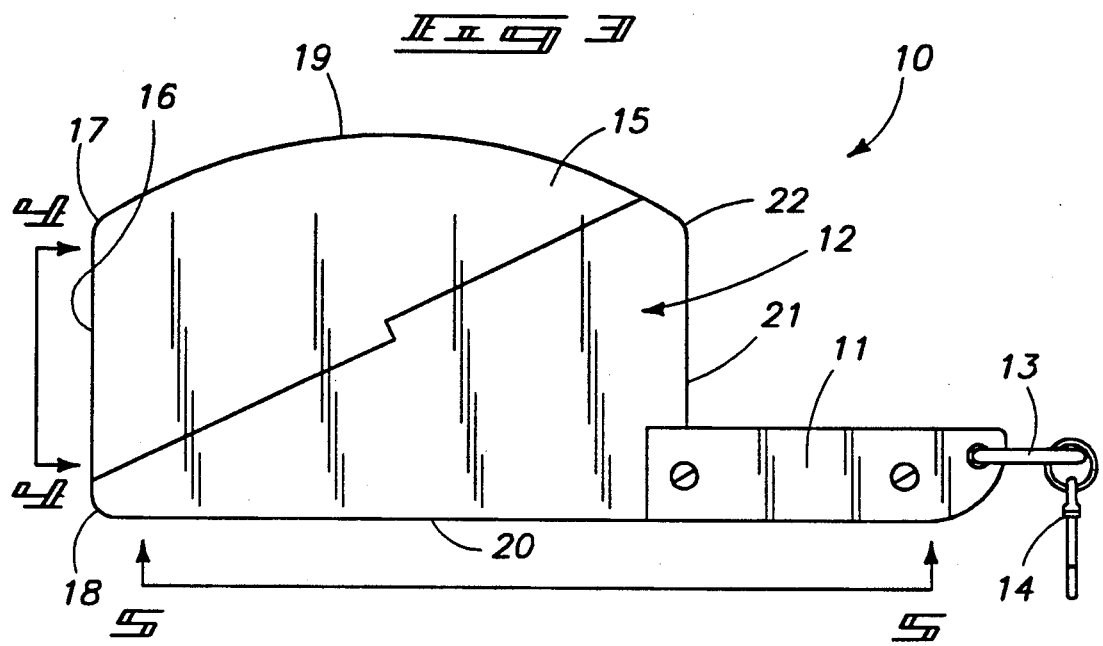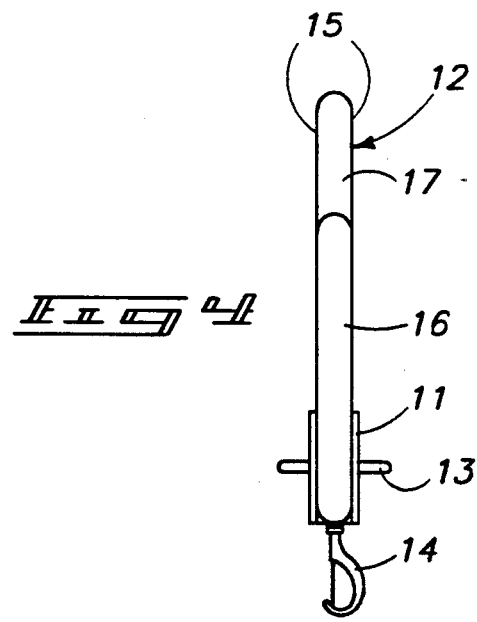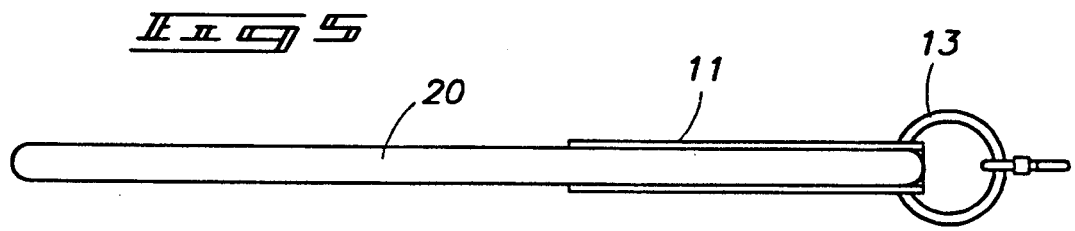

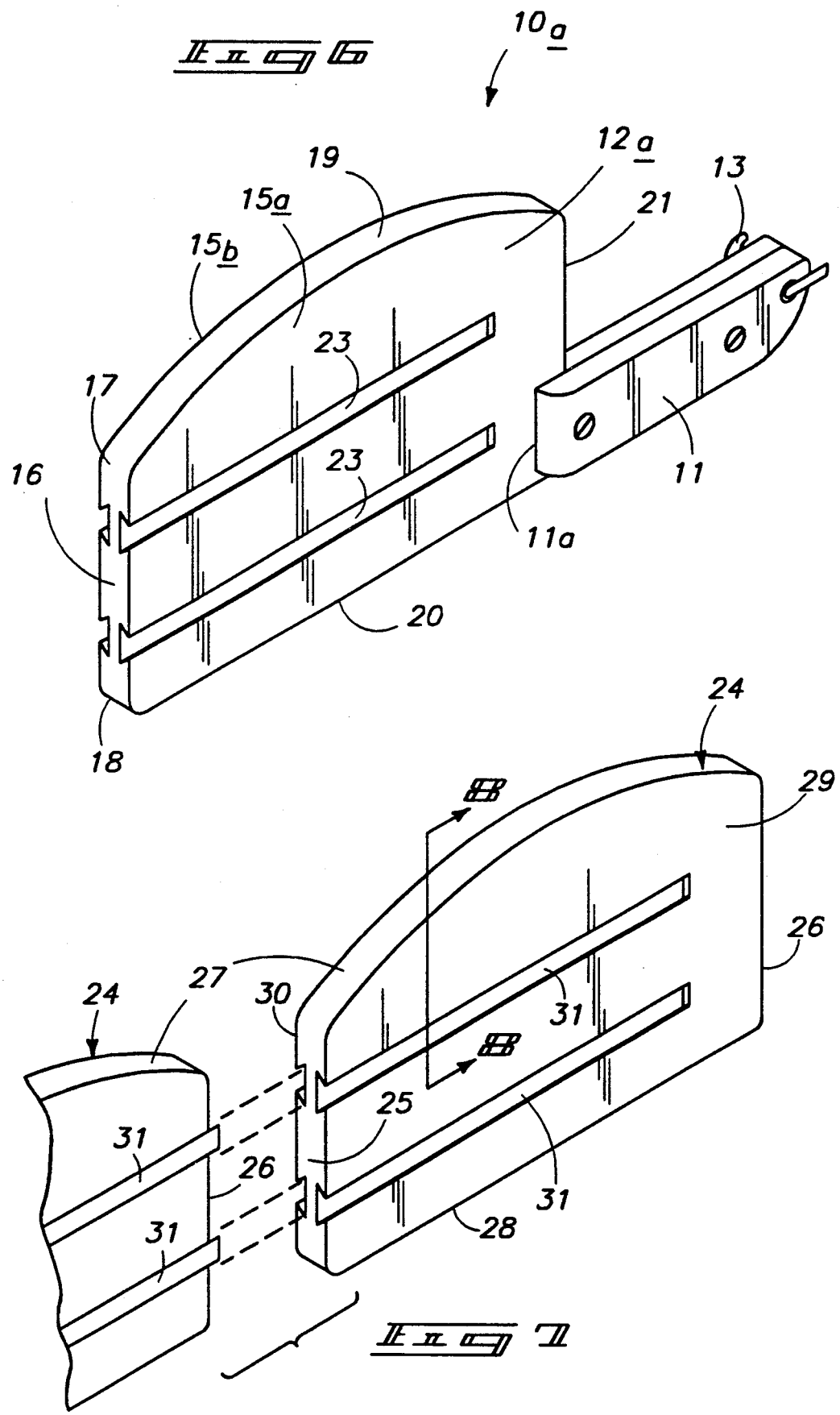

ROW SPACING TOOL

BACKGROUND OF THE INVENTION

1. Field of the Invention

The field of invention relates to tool apparatus, and more particularly pertains to a new and improved row spacing tool wherein the same is arranged to project the tool between adjacent rows upon a shelf to provide proper spacing between the rows.

2. Description of the Prior Art

Various tool structure is utilized throughout the prior art for various purposes utilizing a blade and handle organization. Such structure is exemplified in U.S. Pat. No. 4,010,513 to Sassi wherein a wiper structure utilizes a fixed blade mounted to an elongate handle, wherein the handle includes a longitudinally extending spine mounting the blade thereto.

U.S. Pat. No. 4,536,910 to Clark sets forth a spatula hand tool utilizing a forward blade longitudinally mounted to a rearwardly positioned handle.

U.S. Pat. No. 4,817,229 to Sedillo sets forth a knife structure utilizing a rotatable blade that is pivotal about a forward end of the handle.

U.S. Pat. No. 4,297,761 to Loos sets forth a tool utilized for agitating components within a garbage disposal, wherein a handle is orthogonally mounted to a downwardly projecting fixed blade.

As such, it may be appreciated that there continues to be a need for a new and improved row spacing tool as set forth by the instant invention which addresses both the problems of ease of use as well as effectiveness in construction in providing proper spacing between various rows of components mounted upon shelf structure and in this respect, the present invention substantially fulfills this need.

SUMMARY OF THE INVENTION

In view of the foregoing disadvantages inherent in the known types of tool apparatus now present in the prior art, the present invention provides a row spacing tool wherein the same utilizes a fixed blade mounted to a handle arranged for projecting between rows of components upon a shelf to provide proper spacing between rows of such components. As such, the general purpose of the present invention, which will be described subsequently in greater detail, is to provide a new and improved row spacing tool which has all the advantages of the prior art tool apparatus and none of the disadvantages.

To attain this, the present invention provides a tool for projecting between rows of various components such as canned goods and the like mounted upon shelving to properly space such rows for use and display and thereby minimize time and row positioning. The tool includes a fixed blade mounted to a handle, with the blade including an arcuate upper and lower surface of a forward planar end. The tool optionally may include adapter blades to provide varying thickness of the adapter blade enhanced blade structure to vary the aforenoted row spacings.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved row spacing tool which has all the advantages of the prior art tool apparatus and none of the disadvantages.

It is another object of the present invention to provide a new and improved row spacing tool which may be easily and efficiently manufactured and marketed.

It is a further object of the present invention to provide a new and improved row spacing tool which is of a durable and reliable construction.

An even further object of the present invention is to provide a new and improved row spacing tool which is susceptible of a low cost of manufacture with regard to both materials and labor, and which accordingly is then susceptible of low prices of sale to the consuming public, thereby making such row spacing tools economically available to the buying public.

Still yet another object of the present invention is to provide a new and improved row spacing tool which provides in the apparatuses and methods of the prior art some of the advantages thereof, while simultaneously overcoming some of the disadvantages normally associated therewith.

Still another object of the present invention is to provide a new and improved row spacing tool wherein the same is arranged for projecting a blade portion of the tool between adjacent rows of components mounted upon a shelf to provide proper spacing between such rows.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view, taken in elevation, of the instant invention.

FIG. 4 is an orthographic frontal view of the instant invention.

FIG. 5 is an orthographic bottom view of the instant invention.

FIG. 6 is an isometric illustration of a modification of the instant invention.

FIG. 7 is an isometric illustration of adapter plates utilized by the invention, as set forth in FIG. 6.

DESCRIPTION OF THE PREFERRED EMBODIMENT

Figure 1:
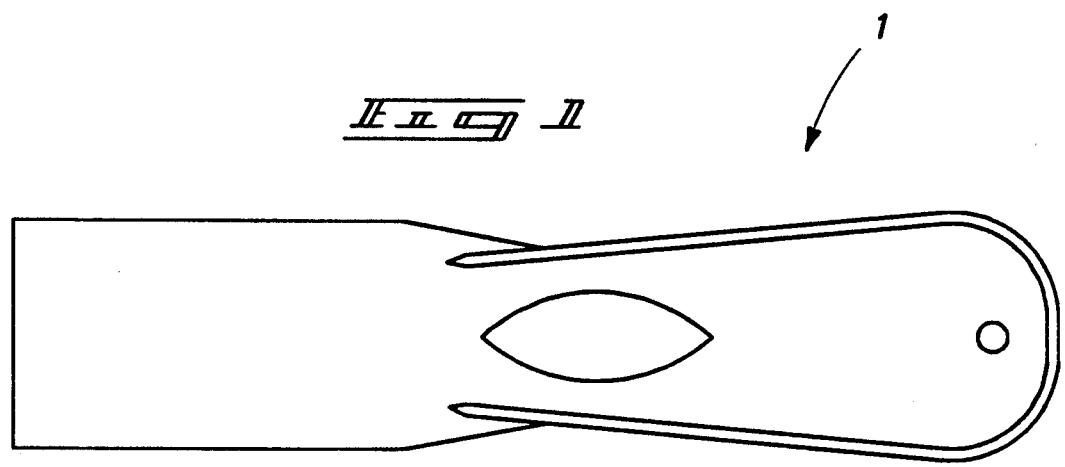
FIG. 1 is an orthographic top view of a prior art tool apparatus.

With reference now to the drawings, and in particular to FIGS. 1 to 9 thereof, a new and improved row spacing tool embodying the principles and concepts of the present invention and generally designated by the reference numerals 10 and 10a will be described.

Figure 2:
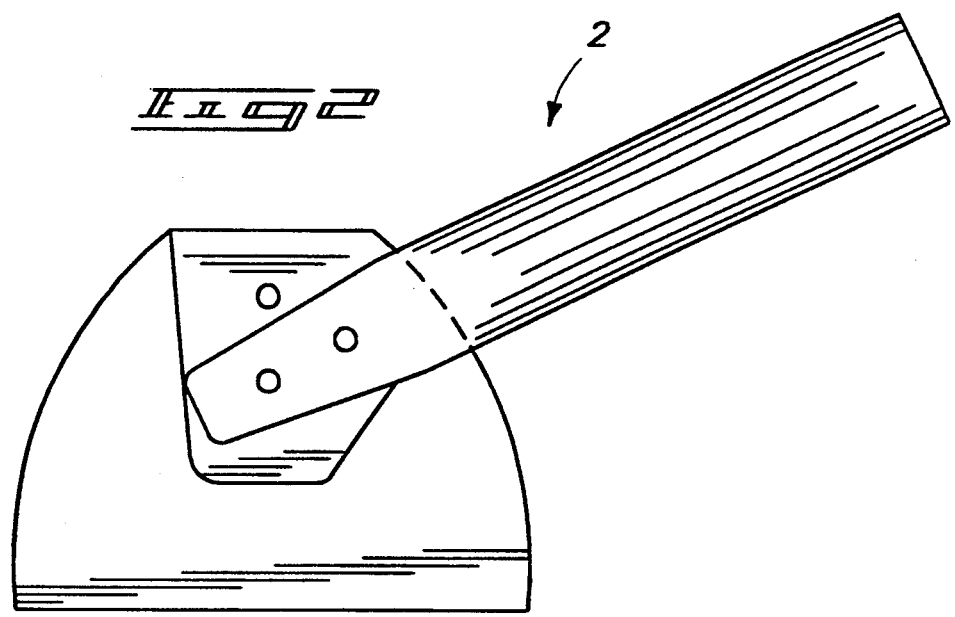
FIG. 2 is an orthographic side view of a further example of a prior art tool apparatus.
Figure 8:
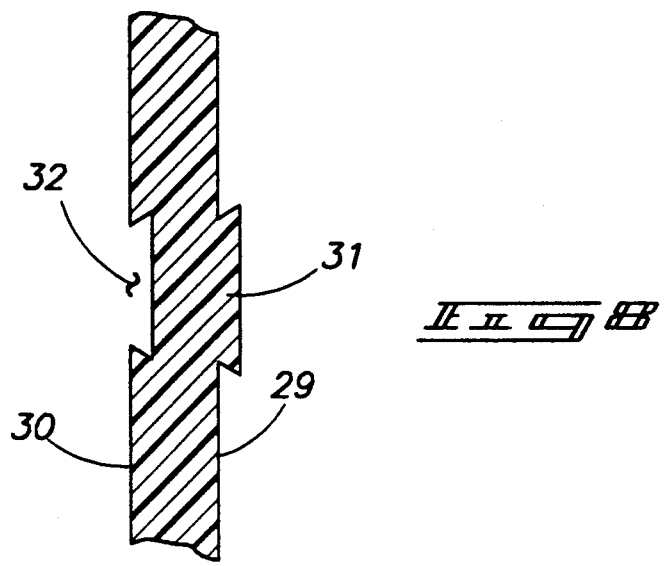
FIG. 8 is an orthographic view, taken along the lines 8—8 of FIG. 7 in the direction indicated by the arrows.
Figure 9:
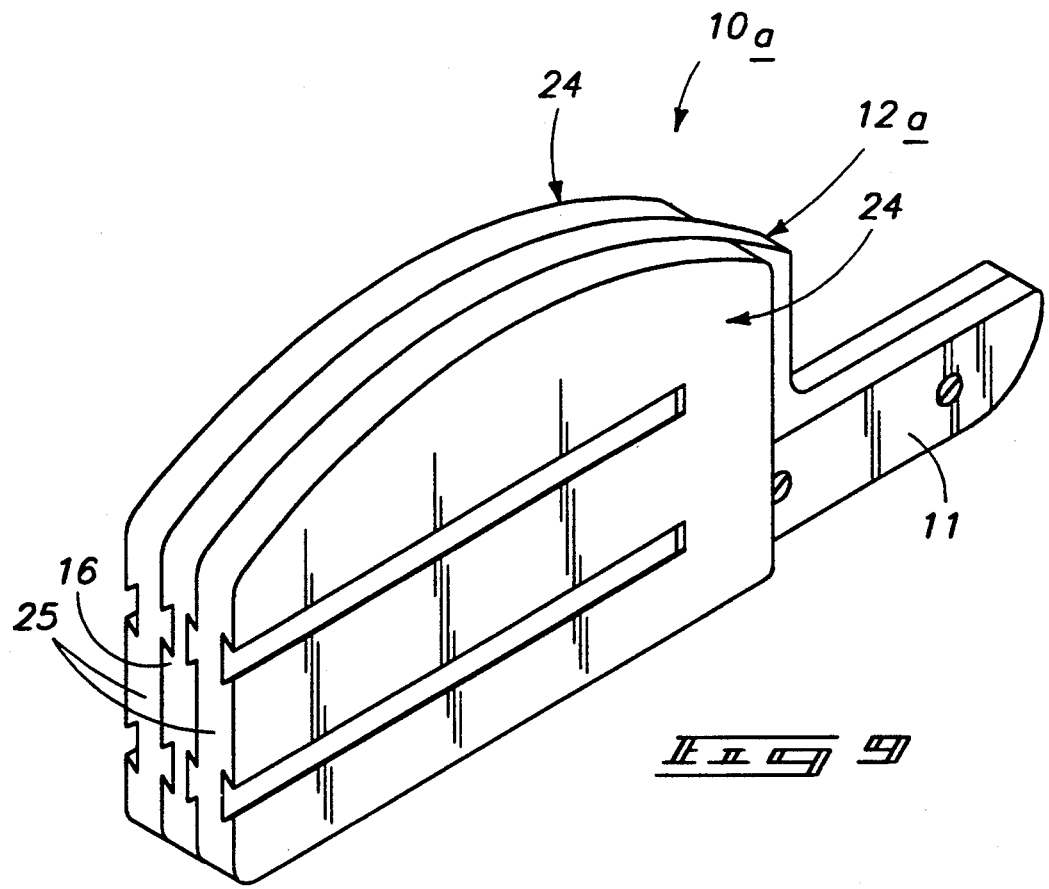
FIG. 9 is an isometric illustration of the tool structure in combination with the adapter plates, as illustrated in FIGS. 6-8.

FIG. 1 is an orthographic top view of a prior art spatula type hand tool 1, as set forth in U.S. Pat. No. 4,536,910, utilizing a fixed handle and longitudinally aligned blade. FIG. 2 illustrates a further prior art tool structure 2, as set forth in U.S. Pat. No. 4,817,229, utilizing a forward blade pivotally mounted to a forward portion of the rigid handle.

More specifically, the row spacing tool 10 of the instant invention essentially comprises a handle member 11 mounted fixedly to a blade 12. A support ring 13 rotatably mounted through an opening directed through the handle 11, wherein the support ring 13 mounts a clip member 14 thereon to permit securement of the tool 10 to a garment or belt-like. Structure of an individual. The blade 12 includes spaced planar side walls 15 and a planar forward edge 16 orthogonally oriented relative to the side walls 15. A forward edge arcuate upper end portion 17 and a forward edge arcuate lower end portion 18 define upper and lower end portions of the forward edge 16. An arcuate top edge 19 extends from the arcuate upper end portion 17 rearwardly to a planar rear edge 21 that is arranged parallel relative to the forward edge 16 and orthogonally to a planar bottom edge 20. The planar rear edge 21 includes a arcuate upper end portion 22. The arcuate portions 17, 18, and 22 provide ease of projecting of the blade between adjacent rows of various components (not shown), as may be typically found in food stores for example.

FIGS. 6-9 illustrate a modified aspect of the instant invention setting forth a row spacing tool 10a. The modified tool 10a includes modified blade structure 12a defined by respective first and second planar blade side walls 15a and 15b, wherein each of the first and second planar blade side walls 15a and 15b are parallel relative to one another and include parallel first trapezoidal grooves 23 extending from the forward edge 16 parallel to the bottom edge 20 and spaced from the rear edge 21.

The first trapezoidal grooves 23 on each of the first and second side walls 15a and 15b are in coextensive aligned relationship relative to one another on the first and second side walls, as illustrated in FIG. 6 for example.

The modified tool structure 10a includes the use of adapter plates 24 that are in a configuration substantially complementary to the modified blade structure 12a, wherein the modified blade structure 12a is defined by a first predetermined length between the forward edge 16 and the rear edge 21, whereas the adaptor plates 24 are defined by a second predetermined length extending from an adapter plate forward end 25 to an adapter plate rear end 26, wherein the second predetermined length is less than the first predetermined length, and wherein the adapter plate rear end 26 is equal to a second length extending from the forward edge 16 to a handle member forward edge 11a, such that the forward edge 11a functions as an abutment against the adapter plate rear end 26 when the adapter plate 24 is mounted upon the blade structure 12a. The adapter plate 24 includes an adapter plate first side wall and an adapter plate second side wall 29 and 30 respectively, wherein the first side wall 29 includes a plurality of spaced parallel trapezoidal tongue members 31 complementarily received within a pair of the first trapezoidal grooves 23. The second side wall 30 of the adapter plate includes trapezoidal second grooves 32 to receive trapezoidal tongue members 31 of a further adapter plate 24 to provide stacking of the plates, as illustrated in FIG. 7 for example. In this manner, the blade structure 12a supports the adapter plate 24 to vary the thickness of the tool structure 10a and thereby modify whatever row spacing is desired by an individual.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A row spacing tool comprising, a rigid blade member, the blade member including a blade member first side wall and a blade member second side wall, the blade member first side wall and second side wall are parallel relative to one another and coextensive relative to one another, and the blade member including a planar bottom edge, and a planer forward edge orthogonal relative to the planar bottom edge, and a rear edge arranged parallel to the planar forward edge, and an arcuate top edge extending from the planar forward edge to the planar rear edge, and the planar forward edge including an arcuate lower end portion and an arcuate upper end portion arranged to ease projection of the blade member between adjacent workpiece components, and a handle member is fixedly mounted to the blade member and orthogonally oriented relative to the planar rear edge, wherein the handle member is aligned with the planar bottom edge, and the handle member includes a handle member forward edge, and the forward edge is spaced from the rear edge a first predetermined length and the handle member forward edge is spaced from the forward edge of the blade member a second length, wherein the second length is less than the first length, and the blade member first side wall and the blade member second side wall each include a pair of elongate first trapezoidal grooves, wherein each of the trapezoidal grooves on the blade member first side wall and the blade member second side wall are coextensive relative to one another and each pair of first trapezoidal grooves on each of the first and second blade member side walls are arranged parallel relative to one another and spaced apart a predetermined spacing, and at least one adapter plate, the adapter plate is defined by a configuration complementary to a further configuration defined by the blade member, and wherein the adapter plate includes an adapter plate forward end and an adapter plate rear end and each parallel relative to one another and spaced apart a length equal to the second predetermined length, whereupon mounting of the adapter plate to the blade member aligns the blade member forward edge with the adapter plate forward end.

2. An apparatus as set forth in claim 1 wherein the adapter plate includes an adapter plate first side wall and an adapter plate second side wall, the adapter plate first side wall includes a plurality of elongate trapezoidal tongue members spaced apart the predetermined spacing and complementarily receivable within said first trapezoidal grooves of the blade member first side wall or the blade member second side wall.

3. An apparatus as set forth in claim 2 wherein the adapter plate second side wall includes a plurality of second grooves coextensive with the trapezoidal tongue members and aligned with the trapezoidal tongue members adapted to receive a further adapter plate within the trapezoidal second grooves.

* * * * *